United States Patent [19]

Suzuki et al.

[11] 4,115,132

[45] Sep. 19, 1978

[54] SEALING COMPOSITION

[75] Inventors: Yoshiro Suzuki; Yoshinori Kokubu, both of Tokyo; Jiro Chiba, Yokohama; Morihisa Hara, Tokyo; Shigehiro Nagahara; Koichi Yamamoto, both of Funabashi, all of Japan

[73] Assignee: Asahi Glass Company Ltd., Tokyo, Japan

[21] Appl. No.: 847,928

[22] Filed: Nov. 2, 1977

[30] Foreign Application Priority Data

Nov. 9, 1976 [JP] Japan .................................. 51-133822

[51] Int. Cl.$^2$ ............................................. C03C 3/12
[52] U.S. Cl. ..................................... 106/53; 106/39.8; 106/47 R; 106/73.3; 65/155
[58] Field of Search ................ 106/53, 49, 47 R, 73.3, 106/39.6, 39.8; 65/155

[56] References Cited

U.S. PATENT DOCUMENTS

| 2,889,952 | 6/1959 | Claypoole | 106/39.6 |
| 3,061,664 | 10/1962 | Kegg | 106/49 |
| 3,258,350 | 6/1966 | Martin et al. | 106/47 R |
| 3,291,586 | 12/1966 | Chapman et al. | 106/53 |
| 3,663,244 | 5/1972 | Martin | 106/39.8 |
| 3,954,486 | 7/1976 | Francel et al. | 106/53 |

FOREIGN PATENT DOCUMENTS

| 49-41,803 | 11/1974 | Japan | 106/54 |
| 863,500 | 3/1961 | United Kingdom. | |
| 1,237,412 | 6/1971 | United Kingdom. | |

*Primary Examiner*—Helen M. McCarthy
*Attorney, Agent, or Firm*—Oblon, Fisher, Spivak, McClelland & Maier

[57] ABSTRACT

A sealing composition which can be suitably used for sealing a panel and a funnel of a color television tube is disclosed. The composition consists essentially of 60 – 99 wt.% of low melting devitrifiable glass powder, 1 – 35 wt.% of lead titanate powder and 0 – 5 wt.% of zircon powder. The glass powder has a composition of 77 – 83 wt.% of PbO, 7 – 10 wt.% of $B_2O_3$, 7 – 12 wt.% of ZnO and 1 – 3 wt.% of $SiO_2$.

4 Claims, No Drawings

SEALING COMPOSITION

BACKGROUND OF THE INVENTION

1. Field of the Invention

The present invention relates to a sealing composition. More particularly, it relates to a sealing composition comprising low melting devitrifiable glass powder and low thermal expansion crystalline powder which achieves a seal at the devitrified state by a heat-treatment at a relatively lower temperature and which is suitable for sealing a panel (face plate) and a funnel of a color television tube.

2. Description of the Prior Arts

Heretofore, it has been known to use $PbO$—$B_2O_3$—$ZnO$—$SiO_2$ type low melting devitrifiable glass solder disclosed in British Pat. No. 863,500, for sealing a panel and a funnel of a color television tube.

When the conventional glass solder is used, in order to achieve a satisfactory seal, it has been necessary to provide a heat-treatment at 440° to 450° C. for about 1 hour.

The heat-treatment at high temperature may cause a transformation of the sealed parts such as the panel and funnel and it may cause a thermal transformation of the other parts heated at high temperature during the heat-treatment, such as a shadow mask whereby it has been required to lower the temperature in the sealing step. It is also required to lower the sealing temperatare to save the energy.

SUMMARY OF THE INVENTION

It is a main object of the present invention to provide a novel sealing composition which can be used for sealing a panel and a funnel of a color television tube at a devitrified state in a heat-treatment at lower than 420° C.

The other object of the present invention is to provide a sealing composition which has superior characteristics of flow characteristics in the heat-treatment, matching characteristics for sealed parts, devitrification characteristics, mechanical strength and thermal stress resistance in comparison with the conventional glass solder applied at high temperature and which can be practically applied by the heat-treatment at lower than 420° C., which can be obtained by adding a specific amount of lead titanate optionally with zircon powder to a specific $PbO$—$B_2O_3$—$ZnO$—$SiO_2$ type low melting glass powder.

The foregoing and other objects of the present invention have been attained by providing a sealing composition consisting essentially of 60–90 wt. % of low-melting devitrifiable glass powder, 1–35 wt. % of lead titanate powder and 0–5 wt. % of zircon powder wherein said glass powder comprises 77–83 wt. % of PbO, 7–10 wt. % of $B_2O_3$, 7–12 wt. % of ZnO and 1–3 wt. % of $SiO_2$.

DESCRIPTION OF PREFERRED EMBODIMENTS

The reason of the limitation of the composition of the low melting devitrifiable glass which is the main component of the sealing composition of the present invention will be described.

The softening point of the glass is too high and the flow characteristic is inferior in the case of less than 77 wt. % of PbO. The devitrification of the glass is insufficient and the thermal expansion coefficient at the devitrified state is too high in the case of more than 83 wt. %. The optimum content of PbO is in a range of 78.5–81.5 wt. %.

The softening point of the glass is too high and a devitrified product may be formed in the melting operation for the glass in the case of less than 7 wt. % of $B_2O_3$. The devitrification of the glass is not enough in the case of more than 10 wt. % of $B_2O_3$. The optimum content of $B_2O_3$ is in a range of 7.5–10 wt. %.

The devitrification of the glass is not enough in the case of less than 7 wt. % of ZnO. The devitrification rate is too high and the devitrified component may be formed during the melting operation in the case of more than 12 wt. % of ZnO. The optimum amount of ZnO is in a range of 8–11 wt. %.

The $SiO_2$ component is incorporated at a ratio of 1–3 wt. % so as to control the devitrification of the glass and to control the softening point. The effect is not found in the case of less than 1 wt. % of $SiO_2$. The softening point of the glass is too high in the case of more than 3 wt. % of $SiO_2$. The optimum amount of $SiO_2$ is in a range of 1.5–2.5 wt. %.

Total amount of the main components in the glass composition should be at least 98 wt. %. It is possible to incorporate less than 2 wt. % of the other components such as $Sb_2O_3$, F, $As_2O_3$, a refining agent, $Fe_2O_3$, BaO, $Al_2O_3$, an alkalline earth metal oxide and an alkali metal oxide when the characteristics of the glass are not adversely affected by the incorporation.

The glass having the composition flows sufficiently by the heat-treatment at lower than 420° C. for less than 60 minutes especially at 400°–420° C. for 60 minutes and then it is devitrified to attain excellent hearmetic seal. However, the thermal expansion coefficient of the glass at the devitrified state is in a range of about 110–120 × $10^{-7}$ ° $C.^{-1}$ (50°–350° C.) which is relatively high. Accordingly, the glass can not attain suitable seal without the incorporation of a filler, at the devitrified state, to a part having the thermal expansion coefficient of 95–105 × $10^{-7}$ ° $C.^{-1}$ (0°–300° C.) such as the glass for the color television tube.

In the sealing composition of the present invention, 1–35 wt. % of lead titanate powder ($PbTiO_3$) is incorporated as the filler of low thermal expansion crystalline powder, in the specific glass powder. The lead titanate is in a form of tetragonal crystals at lower than 490° C. and has low thermal expansion coefficient such as about $-60 \times 10^{-7}$ ° $C.^{-1}$ at about 490° C. and it can be effectively used for lowering the thermal expansion coefficient of the devitrified product obtained by the heat-treatment of the sealing composition. The flow characteristic of the sealing composition at high temperature is disadvantageously lowered in the case of more than 35 wt. % of lead titanate.

It is possible to incorporate less than 5 wt. % of zircon powder ($ZrSiO_4$) together with the lead titanate. The zircon is effective to control the devitrification rate and to improve characteristics of strength of the sealed product. The optimum amount of zircon powder is less than 0.5 wt. %.

The sealing composition attains two types of seal at the devitrified state to the parts having the thermal expansion coefficient of 95–105 × $10^{-7}$ ° $C.^{-1}$ (0°–300° C.) by the heat treatment at 400°–420° C. for less than 60 minutes.

One type of seal is called as the seal of matched expansion type wherein the residual stress caused in the sealed parts such as the panel and funnel of the television tube by cooling them to room temperature after seal, is in a range of about −30 to +45 Kg/cm². The symbol of − shows the formation of compressive stress in the sealed parts and the formation of tensile stress in the seal portion made of the devitrified sealing composition, whereas the symbol of + shows the formation of tensile stress in the sealed parts and the formation of compressive stress in the seal portion. When the residual stress is lower than −30 Kg/cm², high tensile stress is caused in the seal portion whereby the mechanical strength is lowered and the thermal stress resistance is lowered.

In order to attain this type of seal, it is preferable to combine the following components.

| | |
|---|---|
| low melting devitrifiable glass powder | 86.5 – 95 wt. % |
| lead titanate powder | 5 – 15 wt. % |
| zircon powder | 0 – 0.5 wt. % |

The sealing composition results in the devitrified product comprising the devitrified glass and the crystalline filler which has the thermal expansion coefficient of about $98-105 \times 10^{-7°}$ C.$^{-1}$ (50°–350° C.) by the heat-treatment at 410° C. for 60 minutes.

The other type of seal is the seal of non-matched expansion type and it can be attained by using the sealing composition comprising larger amount of lead titanate to result the devitrified product having low thermal expansion coefficient. In the latter type of seal, high compressive stress can be caused in the seal portion and the thermal stress resistance at the seal portion can be improved.

In order to attain the latter type of seal, it is preferable to combine the following components.

| | |
|---|---|
| low melting devitrifiable glass powder | 69.5 – 85 wt. % |
| lead titanate powder | 15 – 30 wt. % |
| zircon powder | 0 – 0.5 wt. % |

The sealing composition results in the devitrified product having the thermal expansion coefficient of about $80$ to $90 \times 10^{-7°}$ C.$^{-1}$ (50°–350° C.) by the heat-treatment at 410° C. for 60 minutes. When the parts having the thermal expansion coefficient of $95-105 \times 10^{-7°}$ C.$^{-1}$ (0°–300° C.) are sealed with the sealing composition, the residual stress caused in the parts is in a range of about +50 Kg/cm² to +150 Kg/cm². The thermal stress resistance in the seal portion is improved by high compressive stress caused in the seal portion.

The thermal expansion coefficient of the devitrified product obtained by the heat-treatment of the sealing composition of the present invention is not always decided only by the ratio of the glass powder to the filler and it is affected by the other factors such as the formula of the glass, the particle size of the filler etc. whereby the ratio of the glass powder to the filler is not always corresponding to the ranges for the two types of seal.

In order to attain the complete hearmetic seal, the sealing composition of the present invention, should soften and flow under heating to wet the part to be sealed and to uniformly spread on all surface of the part.

As the flow characteristic of the sealing composition of the present invention it is preferably to give at least 26.5 mm of a diameter of a flow button which is formed by press-molding 10 g of the sealing composition powder in a cylindrical shape having an outer diameter of 12.5 mm and heating it at 410° C. for 60 minutes and melt-flowing it in a button shape and devitrifying it to solidify.

One embodiment of the preparation of the sealing composition of the present invention will be illustrated.

The raw materials such as red lead, boric oxide, zinc oxide and silica were blended according to the composition required to prepare a batch. The batch was charged in a plutinum crusible and was melted by heating it at 1000° to 1250° C. for 1 to 2 hours in an electric furnace. The molten glass was crushed by pouring into water or molded in a plate form and pulverizing it by a ball mill in a particle diameter of about 1 to 8 μ. The resulting glass powder was admixed with lead titanate having similar particle diameter and optionally zircon powder to prepare the sealing composition.

The sealing compositions were respectively prepared by preparing the glass powder in the example Nos. 1 to 11 shown in the upper part of Table-1 and pulverizing them and admixing lead titanate (PbTiO₃) and zircon (ZrSiO₄) as the filler at the ratio shown in the lower part of Table-1 with the glass powder. (The content of the glass powder is the residual amount to the filler.) The example No. 12 is the conventional one which does not contain the filler.

Various tests for evaluations of the samples were carried out. The results of the tests are shown in Table-2.

Table 1

| | (Composition of examples) | | | | | | |
|---|---|---|---|---|---|---|---|
| Example | Composition of glass (wt.%) | | | | | Content of filler (wt.%) | |
| No. | PbO | B₂O₃ | ZnO | SiO₂ | Al₂O₃ | PbTiO₃ | ZrSiO₄ |
| 1 | 78 | 10 | 10 | 2 | 0 | 6 | 0 |
| 2 | 79 | 8 | 11 | 2 | 0 | 7 | 0.05 |
| 3 | 79 | 9 | 10 | 2 | 0 | 7 | 0.05 |
| 4 | 80 | 8.5 | 9.5 | 2 | 0 | 9 | 0.05 |
| 5 | 80.5 | 8.5 | 9 | 2 | 0 | 10 | 0.1 |
| 6 | 79.5 | 9 | 10 | 1.5 | 0 | 8 | 0.1 |
| 7 | 79.5 | 9 | 9 | 2.5 | 0 | 8 | 0 |
| 8 | 82 | 8 | 8 | 2 | 0 | 15 | 0.2 |
| 9 | 80 | 8.5 | 9.5 | 2 | 0 | 15 | 1.0 |
| 10 | 81 | 8.4 | 8.8 | 1.8 | 0 | 24 | 0.5 |
| 11 | 79 | 11 | 8 | 2 | 0 | 27 | 0 |
| 12* | 77.5 | 8.5 | 11.0 | 2.0 | 1.0 | 0 | 0 |

(*conventional solder glass)

Table 2

| | (Heating conditions and results of the tests) | | | | | | | | | | | |
|---|---|---|---|---|---|---|---|---|---|---|---|---|
| Example No. | 1 | 2 | 3 | 4 | 5 | 6 | 7 | 8 | 9 | 10 | 11 | 12 |
| Heating temperature (° C) | | | | | 410 | | | | | | 400 | 445 |
| Heating period (min) | | | | | 60 | | | | | | 60 | 60 |
| Diameter of flow button (mm) | 26.5 | 27.0 | 27.0 | 28.0 | 27.5 | 26.5 | 27.5 | 29.0 | 26.5 | 26.6 | 26.0 | 26.5 |
| Residual stress (Kg/cm²) | +20 | +40 | +30 | +40 | +40 | +40 | +10 | +30 | +50 | +80 | +110 | +40 |
| Devitrification period (min) | 40 | 30 | 35 | 45 | 40 | 20 | 20 | 45 | 40 | 35 | 45 | 40 |
| Mechanical strength at room temperature (Kg/cm²) | 330 | 350 | 360 | 370 | 350 | 330 | 350 | 320 | 450 | 450 | 400 | 300 |
| Mechanical strength | 380 | 400 | 400 | 410 | 400 | 360 | 380 | 370 | 410 | 410 | 400 | 350 |

Table 2-continued

| Example No. | (Heating conditions and results of the tests) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| at 400° C (Kg/cm²) | | | | | | | | | | | | |
| Thermal stress resistance (° C) | 50 | 50 | 50 | 50 | 50 | 50 | 50 | 50 | 60 | 66 | 64 | 48 |

TEST FOR FLOW CHARACTERISTICS (FLOW BUTTON TEST)

A 10 g of the powdery sample was press-molded in a cylindrical shape having an outer diameter of 12.5 mm and the molded sample was heat-treated at 410° C. for 60 minutes whereby the molded sample was softened and melt-flowed to spread in a form of button and then, it was devitrified to be solidified. The diameter of the resulting flow button was measured. In the example No. 10, the heat-treatment was carried out at 400° C. for 60 minutes. In the example No. 11, it was carried out at 445° C. for 60 minutes.

RESIDUAL STRESS

A vehicle of amylacetate containing 1 vol. % of nitrocellulose was blended to each powdery sample and the mixture was kneaded to form a paste and the paste was coated on a glass plate of a television tube panel glass (38 × 19 × 4 mm) having a thermal expansion coefficient of $100 \times 10^{-7°}$ C.$^{-1}$ (0°–300° C.) and it was heated from the room temperature to the heating temperature (410° C. in Examples 1 to 10; 400° C. in Example 11; and 445° C. in Example 12), at a rate of 15° C./min and it was kept at the temperature for 60 minutes and then it was cooled to the room temperature at a rate of 15° C./min. In the sealed glass plate, the stress was caused depending upon the difference of expansion between the glass plate and the sealed layer. The birefringence caused by the stress in the glass plate was measured by a polarimeter and was calculated as Kg/cm² with the stress-optical coefficient.

DEVITRIFICATION PERIOD

The powdery sample was charged in a differential thermal analyzer and was heated from the room temperature to the heating temperature at the rate of 15° C./min and the DTA thermogram in the process was measured and the time from the initiation of maintaining the heating temperature to the peak of crystallisation exotherm was measured and shown as the devitrification period in Table 2.

When the devitrification period is too short, the melt-fluidity of the sealing composition is not satisfactory in the practical sealing operation whereas when it is too long the devitrification is not satisfactory and the practical sealing operation can not be done. The optimum devitrification period is in a range of 20 to 40 minutes.

MECHANICAL STRENGTH AT ROOM TEMPERATURE AND AT HIGH TEMPERATURE

The powdery sample was press-molded and the molded sample (70 × 70 × 10 mm) was heated under the heating conditions described in Table-1 and the bending strength of the product was measured at the room temperature and 400° C. The bending strength is enough to be higher than 300 Kg/cm² for the practical uses.

THERMAL STRESS RESISTANT

When a panel and a funnel of a color television tube are sealed, a temperature difference between the outer part and the inner part of the tube is caused in the cooling step etc. whereby the thermal stress is caused near the seal portion to be broken. In usual, when the break of the seal portion is not caused under the temperature difference of more than 45° C., there is no trouble in the practical used.

The panel and the funnel were sealed with the powdery sample and the temperature difference between the outer part and the inner part of the bulb was given to measure the thermal stress resistance.

From the results of the tests, it is clearly understood that the sealing compositions of the present invention impart excellent characteristics even though the heat-treatments are carried out at lower than 420° C.

What is claimed is:

1. A sealing composition consisting essentially of, in weight %:

| low melting devitrifiable glass powder | 86.5 – 95 |
|---|---|
| lead titanate powder | 5 – 15 |
| Zircon powder | 0 – 0.5 | wherein said low melting devitrifiable glass powder has a composition consisting essentially of, in weight %:

| PbO | 77 – 83 |
|---|---|
| B₂O₃ | 7 – 10 |
| ZnO | 7 – 12 |
| SiO₂ | 1 – 3 | and wherein said sealing composition can achieve a seal of matched expansion type to a material having a thermal expansion coefficient of $95-105 \times 10^{-7°}$ C.$^{-1}$ (0°–300° C.) at a devitrified state by a heat-treatment at a temperature not higher than 420° C. within a period of 60 minutes.

2. The sealing composition claimed in claim 1, wherein said glass powder has a composition consisting essentially of, in weight %:

| PbO | 78.5 – 81.5 |
|---|---|
| B₂O₃ | 7.5 – 10.0 |
| ZnO | 8.0 – 11.0 |
| SiO₂ | 1.5 – 2.5 |

3. A sealing composition consisting essentially of, in weight %:

| low melting devitrifiable glass powder | 69.5 – 85 |
|---|---|
| lead titanate | 15 – 30 |
| Zircon powder | 0 – 0.5 | wherein said low low melting devitrifiable glass powder has a composition consisting essentially of, in weight %:

| | |
|---|---|
| PbO | 77 – 83 |
| $B_2O_3$ | 7 – 10 |
| ZnO | 7 – 12 |
| $SiO_2$ | 1 – 3 | and wherein said sealing composition can achieve a seal of non-matched expansion type to a material having a thermal expansion coefficient of $95-105 \times 10^{-7}$ °C.$^{-1}$ (0°–300° C.) at a devitrified state by a heat-treatment at a temperature not higher than 420° C. within a period of 60 minutes.

4. The sealing composition claimed in claim 2, wherein said glass powder has a composition consisting essentially of, in weight %:

| | |
|---|---|
| PbO | 78.5 – 81.5 |
| $B_2O_3$ | 7.5 – 10.0 |
| ZnO | 8.9 – 11.0 |
| $SiO_2$ | 1.5 – 2.5 |

* * * * *